Figure 1:
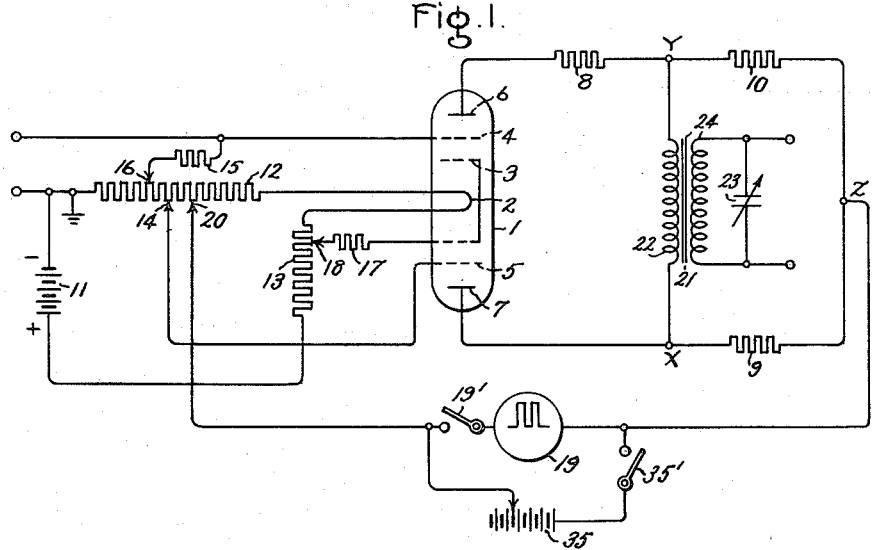

Inventor:
James M. Lafferty,
by Richard E. Hosley
His Attorney.

UNITED STATES PATENT OFFICE 2,540,825

DIRECT CURRENT AMPLIFICATION SYSTEM

James M. Lafferty, Schenectady, N. Y., assignor to General Electric Company, a corporation of New York Application January 22, 1949, Serial No. 72,204

3 Claims. (Cl. 332—47)

My invention relates to a system for the amplification of uni-directional currents wherein the direct current which is to be amplified is converted into a pulsating or an alternating current.

In order to circumvent the limitations and shortcomings of conventional direct current amplifiers, it has become common practice to convert the direct current which is to be amplified into a pulsating or an alternating current which then can be subjected to more efficient alternating current amplification. The conventional method of accomplishing this conversion is by means of a mechanical interrupter or vibrator which produces current pulses capable of being amplified by an alternating current amplifier. However, the electrical contact noise inherent in a mechanical system of this type greatly reduces its sensitivity. Other entirely electrical systems which have been suggested for accomplishing this conversion have been relatively unstable and insensitive. Accordingly, one object of my invention is to provide an extremely sensitive and stable electrical circuit for converting direct currents into alternating currents.

The stability of direct current amplifiers has been limited heretofore by intermittent fluctuations and slow drifts caused by variations in supply voltage and in filament emission. It is a further object of my invention, therefore, to provide an amplifying circuit for direct current which automatically negatives the effect of such fluctuations and drifts.

An additional object of my invention is to provide an electrical circuit for amplifying extremely small uni-directional voltages with high fidelity.

A still further object of my invention is to provide an electrical circuit which simultaneously accomplishes an amplification of a direct current as well as a conversion of the direct current into an alternating current.

Briefly stated, in accordance with one embodiment of my invention, I provide a bridge circuit in which a double or split multi-electrode electron discharge device having a common source of electrons is connected into a bridge circuit as two adjacent arms thereof. The bridge is first balanced with a predetermined value of direct voltage applied as the source of bridge power. This direct voltage is thereafter replaced by a square wave of voltage of a frequency considerably higher than any variation in the direct current to be amplified and having an amplitude equal to the magnitude of this balancing direct voltage. The output of the bridge is taken through a transformer which is connected across the balancing points of the bridge and whose secondary winding is tuned to the fundamental frequency component of the square wave. The direct current which is to be amplified is applied to a controlling electrode of one section of the electron discharge device comprising one arm of the bridge. The resultant unbalanced condition of the bridge causes pulsating current to flow through the transformer. This current appears across the secondary of the transformer as a sine wave of a frequency equal to the fundamental of the square wave and of an amplitude proportional to the magnitude of the direct current input.

The novel features which I believe to be characteristic of my invention are set forth with particularity in the appended claims. My invention itself, however, together with further objects and advantages thereof may best be understood by reference to the following description taken in connection with the accompanying drawing in which Fig. 1 is a schematic circuit diagram of one basic form of my invention and Fig. 2 is a circuit diagram of a modification of my invention incorporating certain refinements providing greater stability and sensitivity.

Figure 2:
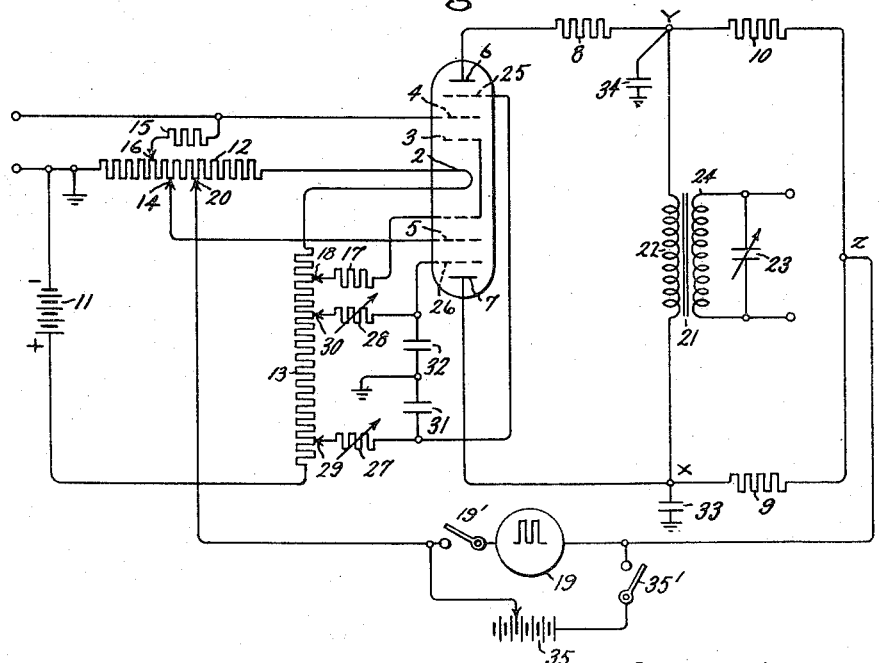

Referring to Fig. 1, I have shown an amplifying circuit in accordance with my invention which utilizes a double or split multi-electrode electron discharge device 1, preferably of the type described in an article by Dr. K. H. Kingdon and myself, entitled, "Improvements in the Stability of the F. P.–54 Electrometer Tube" and published in the Journal of Applied Physics, November, 1946. This device 1, known as a Split F. P.–54 Electrometer Tube or a G. L. 5674 tube, has a common thermionic filament 2, a common concentric space charge electrode 3, a pair of separate control electrodes 4 and 5, and a pair of anodes 6 and 7. It is normally operated with relatively low potentials on its electrodes, usually not exceeding 6 volts in magnitude. I prefer to use an electron discharge device of this character because its common filament aids in the compensation of fluctuations of electron emission when used in conjunction with my invention. Furthermore, the low potentials necessary to operate device 1, not only minimize the possibility of input circuit current due to ionization of residual gas within the device, but also reduce the noise level therein.

As fully described in the aforementioned article by Dr. Kingdon and myself, discharge device 1 is preferably constructed to have its potential minimum around the filament concentrically displaced therefrom by a distance of at least twelve filament diameters. This distance is great enough to permit a uniform redistribution of the space charge around the filament if a change in emission occurs on one side of the filament alone.

One section of discharge device 1 comprising filament 2 and electrodes 3, 5 and 7 is connected to a balance point X as one arm of a conventional Wheatstone bridge. The other section of discharge device 1 comprising filament 2 and electrodes 3, 4 and 6 is connected through a balancing impedance element such as resistor 8 to an opposing balance point Y as an adjacent arm of the bridge circuit. A pair of matching impedance elements such as resistors 9 and 10 are connected as the balancing arms of the bridge from a common point Z to points X and Y respectively.

The direct current operating potentials for discharge device 1 with the exception of anode potentials, are obtained from a voltage dividing circuit connected between a positive terminal and a grounded negative terminal of a unidirectional current source such as battery 11. This voltage dividing circuit comprises a multiple-tapped impedance element such as a potentiometer 12 connected in series with filament 2 and with another tapped impedance element such as potentiometer 13.

In order to facilitate the balancing of the bridge circuit, I provide means for adjusting the operating points and consequent quiescent current flow through each section of discharge device 1. Many different methods of accomplishing this adjustment can be easily devised by those skilled in the art. One simple and convenient arrangement as illustrated in Fig. 1, is by a direct connection from control electrode 5 to a variable tap 14 on potentiometer 12, and by a connection from control electrode 4 through a grid return high impedance element 15 to another variable tap 16 of potentiometer 12. The space charge electrode 3 is connected through a load impedance element 17 to an adjustable tap 18 on potentiometer 13, any point of which is positive with respect to the filament 2. This space charge electrode 3 is preferably included in discharge device 1 in order to accomplish a substantial current flow through the device 1 despite its low operating potentials.

The direct voltage to be amplified is developed across impedance element 15 and is directly applied to the controlling electrode 4 of one section of discharge device 1.

Anode voltage for both sections of device 1 is supplied through resistors 8, 9 and 10 by a source of square wave voltage such as square wave generator 19 connected through switch 19' between point Z and an adjustable tap 20 of potentiometer 12. The fundamental frequency component of this square wave is considerably higher than any variation in the direct current to be amplified.

The output of the bridge circuit is taken from a transformer 21 whose primary winding 22 is connected as a diagonal of the bridge circuit from point X to point Y. These points, X and Y, are of equal potential when the bridge circuit is balanced. The transformer 21 is tuned to the fundamental frequency of the square wave generator 19 by means of a variable capacitance 23 connected across its secondary winding 24.

Referring now to Fig. 2, I have illustrated a circuit diagram of an amplifier essentially similar to Fig. 1 but incorporating additional elements to compensate for any instability resulting from the alternating component of the applied square wave. Screening electrodes 25, 26 are included within discharge device 1 in order to minimize any undesirable control electrode-to-filament alternating current permitted by the inter-electrode capacity between the controlling electrodes 4 and 5 and their adjacent anodes 6 and 7 respectively. Voltage is supplied to the screening electrodes 25, 26 by separate connections through a pair of variable resistive elements 27, 28 to a pair of adjustable taps 29, 30 of potentiometer 13. Capacitors 31 and 32 are connected from the screening electrodes 25, 26 to ground and provide a low impedance path for alternating current in order to maintain the screening electrodes at a constant potential.

For optimum accuracy and stability, it is desirable that points X and Y be balanced, in the absence of an input signal, for the alternating current condition caused by the application of the square wave, as well as for the direct current condition existing during the major operating portion of the square wave cycle. In order to maintain the capacitive balance between points X and Y, it may be necessary to add a capacitance such as capacitors 33, 34 from either point X or point Y to ground. In all other respects the circuit of Fig. 2 is identical to that of Fig. 1.

In the operation of my invention, the bridge circuit is first balanced for maximum direct current conditions by the substitution of a uni-directional voltage such as battery 35 adjusted to a magnitude of voltage equal to the amplitude of the square wave which is subsequently to be applied. This substitution may be accomplished by opening switch 19' and closing a switch 35' in the connection to battery 35. The current flow through each side of discharge device 1 is adjusted by taps 16, 18, 20, 29 and 30 until there is no difference in potential between points X and Y although there is considerable current flowing in the anode to filament circuits of both sections of discharge device 1. The direct current anode voltage source is then replaced by the square wave generator 19. If the circuit has been properly balanced, the voltage at both points X and Y fluctuates in synchronization with the voltage of the square wave generator. As a result, no current flows through the primary winding 22 of transformer 21 connected between X and Y.

The direct voltage to be amplified is applied to one arm of the bridge between control electrode 4 and ground. This super-imposed signal voltage varies the operating point of one section of discharge device 1, thereby unbalancing the bridge circuit and causing a pulsating current to flow through primary winding 22. Since the secondary winding is tuned to the fundamental frequency component of the square wave, this pulsating voltage appears as a sine wave of this fundamental frequency across the output of the transformer. This output voltage may then be further amplified by a conventional alternating current amplifier.

A direct current amplifier constructed as described above is extremely sensitive and well adapted for the accurate measurement or utilization of very small voltages produced by equally minute direct currents. The use of a common filament connected in a bridge circuit together with the redistributing effect of the location of the potential minimum causes any variations in electron emission from the filament to be balanced out by the bridge circuit since the two electron discharge streams are affected equally. The use of the bridge type circuit in the same manner also tends to balance out any slow drifts caused by variations in operating potentials. By using a square wave as the source of bridge power, I obtain greater stability because the bridge circuit cannot be made to remain in a balanced condition throughout the entire range of anode voltages that may be applied to the discharge device. Balancing the bridge in the maximum anode voltage region insures that the bridge will maintain its balance during practically the entire operating portion of the square wave cycle. In addition, I obtain greater sensitivity and increase the signal to noise ratio by tuning the secondary of the output transformer to the fundamental frequency of the square wave. Furthermore, the use of an electron discharge device constructed to operate with low electrode potentials minimizes the flow of current through the input circuit which can, therefore, be made to present an extremely high input impedance.

It is to be understood that while I have shown my invention in conjunction with a particular type of electron discharge device, other devices having similar characteristics may be used with equal results. It is also to be understood that while I have shown a particular embodiment of my invention, I do not wish to be limited thereto since many modifications may be made, and, I therefore, contemplate by the appended claims to cover all such modifications as fall within the true spirit and scope of my invention.

What I claim as new and desire to secure by Letters Patent of the United States is:

1. A system for amplifying small unidirectional voltages comprising an electron discharge device having a pair of anodes, a pair of screening electrodes, a pair of controlling electrodes, a common space charge electrode and a common filament, said electrodes being arranged in two sections to produce two electron discharge streams from said common filament upon the application of small operating potentials, a bridge circuit including said two sections connected as adjacent arms thereof, a generator of square wave voltage of a frequency considerably higher than any variation in the unidirectional voltage to be amplified connected to said bridge as the source of power therefor, means to adjust the relative magnitude of said electron streams to produce a pair of balanced points on said bridge, a transformer connected between said balanced points, said transformer having an output winding tuned to the fundamental frequency of said square wave, and means to apply a unidirectional voltage to one of said controlling electrodes thereby to vary the magnitude of one of said electron streams to unbalance said bridge and produce an alternating current flow through said transformer proportional to the magnitude of said unidirectional voltage.

2. A system for amplifying unidirectional voltages comprising an electron discharge device having a pair of anodes, at least one pair of controlling electrodes, a common space charge electrode and a common thermionic source of electrons arranged to produce independent electron discharge streams from said common source to each anode respectively, a bridge circuit comprising said electron discharge device as one pair of adjacent arms thereof and a plurality of impedance elements connected from said anodes to a common point as balancing arms thereof, a generator of square wave voltage connected between said common point and said thermionic source to supply power to said bridge, means to adjust the magnitude of said electron streams whereby a point on one side of said bridge has a varying potential equal to the varying potential of a point on the opposite side of said bridge, means to supply an adjustable unidirectional calibrating voltage in substitution for said square wave voltage whereby said bridge may be balanced at a voltage equal to the amplitude of said square wave voltage, a transformer connected between said balanced points, and an input connection to one of said controlling electrodes for the application of a unidirectional signal voltage to vary the magnitude of one of said electron streams to unbalance said bridge and produce an alternating output voltage from said transformer proportional to said unidirectional signal voltage.

3. An amplifying system comprising an electron discharge device having a pair of anodes, at least one pair of discharge-controlling electrodes and a common thermionic source of electrons, said discharge device being constructed in two sections to produce two substantially independent electron streams from said common source, a bridge circuit having a pair of points of balanced potential, said two sections of said discharge device comprising adjacent arms of said bridge circuit, said arms being connected to said balanced points, a transformer connected across said balanced points, a source of square wave voltage connected to said bridge to supply power thereto, means to supply an adjustable unidirectional calibrating voltage in substitution for said square wave voltage whereby said bridge may be balanced at a voltage equal to the amplitude of said square wave voltage, and means to vary the magnitude of one of said electron streams in accordance with a unidirectional signal voltage, thereby to unbalance said bridge to produce an alternating current flow through said transformer.

JAMES M. LAFFERTY.

REFERENCES CITED

The following references are of record in the file of this patent:

UNITED STATES PATENTS

| Number | Name | Date |
|---|---|---|
| 2,142,940 | Hackenberg et al. | Jan. 3, 1939 |
| 2,202,613 | Urtel | May 28, 1940 |